United States Patent [19]

Mykleby

[11] 4,079,907
[45] Mar. 21, 1978

[54] CUSHIONED SHIPPING SUPPORT

[76] Inventor: Laurie G. Mykleby, 12222 - 93rd Ave., Palos Park, Ill. 60464

[21] Appl. No.: 781,579

[22] Filed: Mar. 28, 1977

[51] Int. Cl.² .............................................. B60P 7/00
[52] U.S. Cl. ............................. 248/119 R; 108/55.1; 108/56.1; 206/599; 206/600; 248/346
[58] Field of Search .................... 108/55.1, 55.3, 56.1; 206/320, 599, 600; 248/19, 20, 119 R, 346, 350

[56] References Cited

U.S. PATENT DOCUMENTS

| | | | |
|---|---|---|---|
| 3,351,189 | 11/1967 | Hoth | 206/320 |
| 3,471,116 | 10/1969 | DeCherrie | 248/119 R |
| 3,602,376 | 8/1971 | DePiano | 248/119 R X |
| 3,621,797 | 11/1971 | Hunter | 108/55.3 X |

Primary Examiner—Lawrence J. Staab
Attorney, Agent, or Firm—Thomas W. Speckman

[57] ABSTRACT

A cushioning, self-unloading machinery carrier which supports the static machine weight and extends beyond the sides and ends of the machinery to absorb lateral shocks and extends beyond the bottom of the machinery to absorb vertical shocks. The machinery carrier is made up of two U-shaped bumper-skids which fit around opposite ends of the machinery, the inner portion of the base of the U having a wedge-shaped portion with a platform at its upper end adjacent the base, the machinery resting upon the platform when the bumper-skid is in position and the machinery sliding down the wedge as the bumper-skid is pulled away from the machinery, lowering the machinery gently into desired position.

9 Claims, 9 Drawing Figures

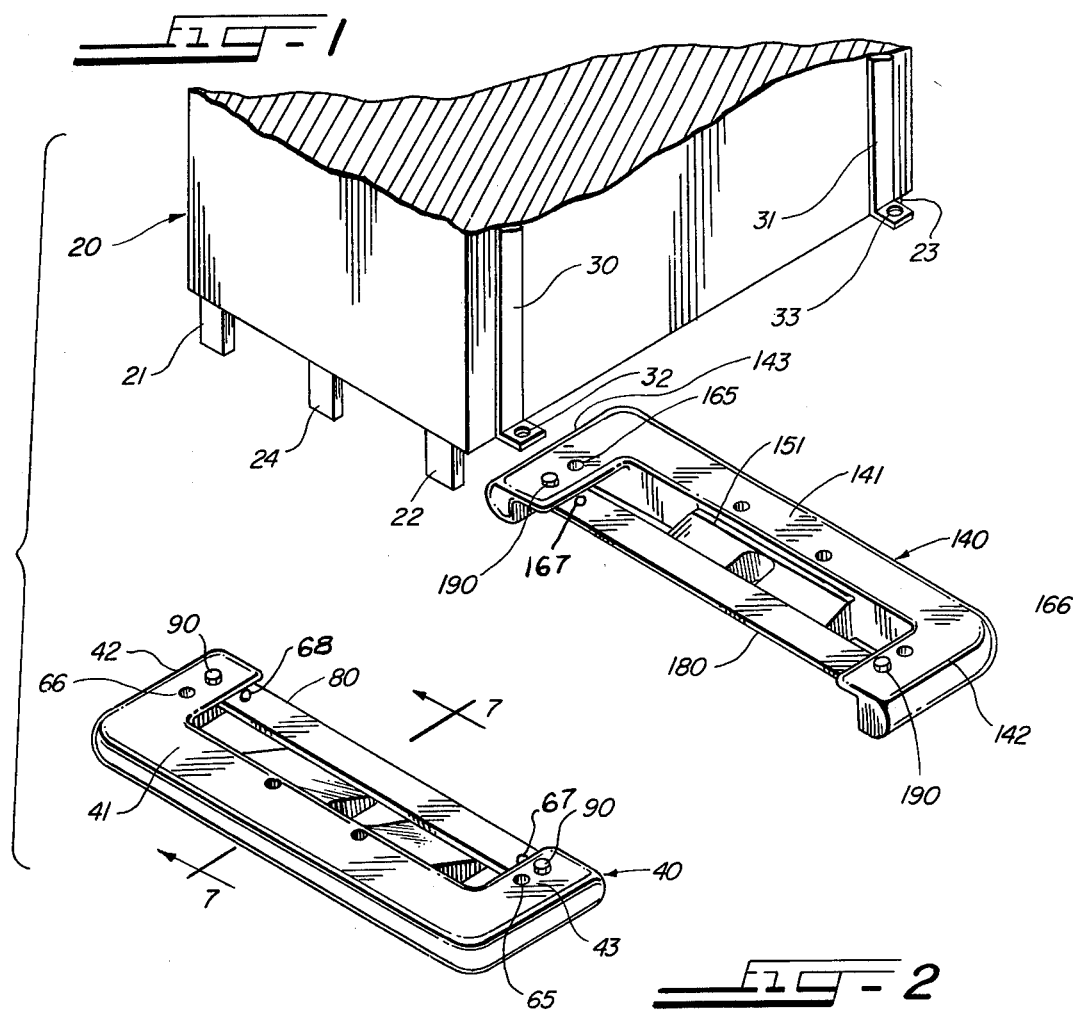

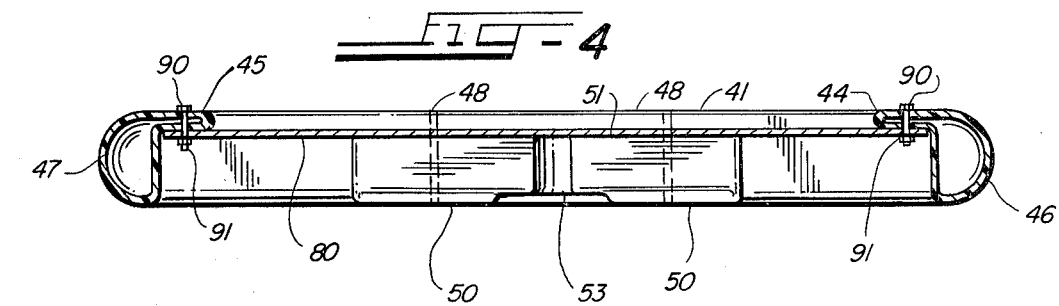
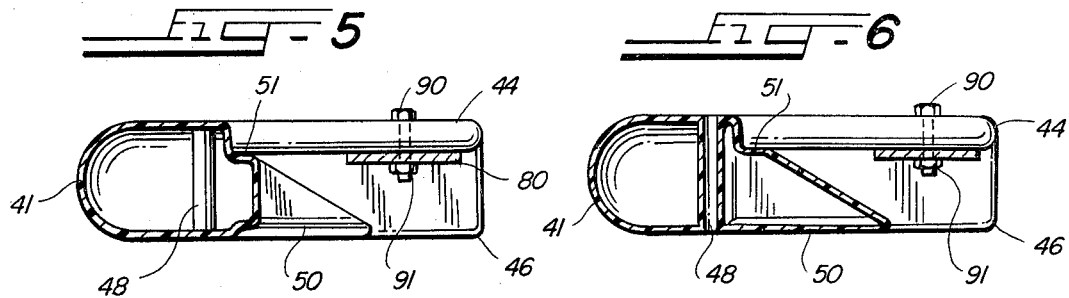
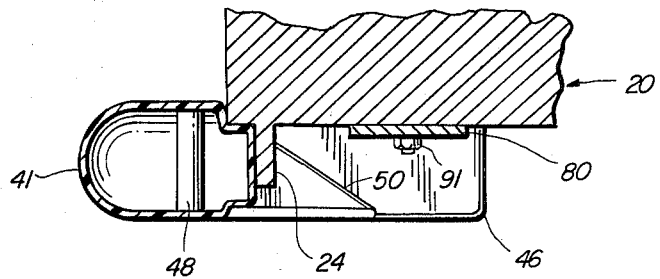
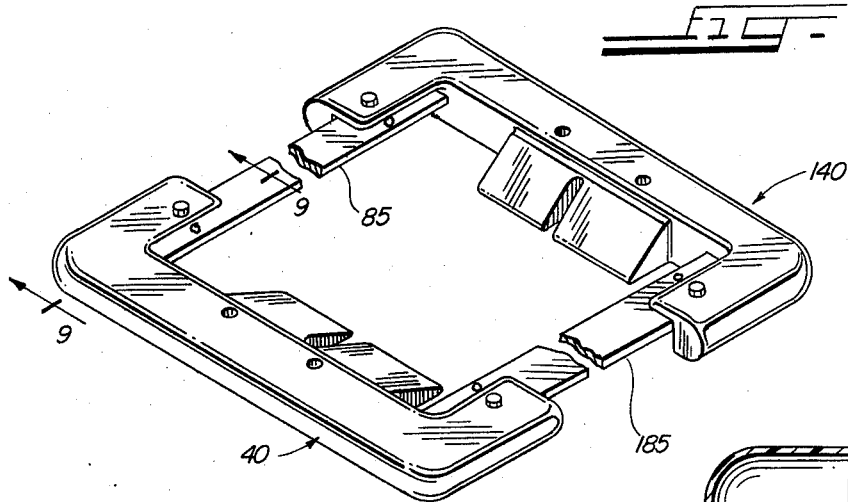
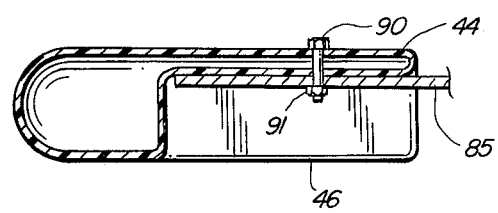

CUSHIONED SHIPPING SUPPORT

This invention relates to a cushioning, self-unloading machinery carrier by which machinery, particularly machinery with casters or legs on the unit to be shipped, can be shipped with protection to the machinery from lateral shocks and vertical shocks. The machinery carrier of this invention provides a unit which may be handled by conventional handling equipment and when received at a destination which does not have material handling equipment, may be readily skidded on the floor and the machinery may be gently unloaded to the desired position without handling equipment. The term "machinery" as used throughout this description and in the appended claims, refers to all types of products such as heavy mechanical equipment for industrial use as well as delicate electronic or scientific apparatus. Many such pieces of machinery have either casters or legs which are especially susceptible to damage in shipment and in removal of the machinery from the shipping container when mechanized handling equipment is unavailable.

Prior attempts to provide cushioning to items while being shipped have included the insertion of various blocking and cushioning components within conventional packaging containers such as illustrated by U.S. Pat. Nos. 3,854,579, 3,275,131 and 3,690,540. However, the devices as disclosed by these patents merely add cushioning to conventional cartons and do not afford protection to legs and casters and do not afford self-unloading. One attempt to provide protection to machinery legs is illustrated by U.S. Pat. No. 3,471,116 showing cellular plastic material which is frictionally retained over such legs. However, lifting of the machinery to remove the protective pallet is necessary. Again, the entire unit is contemplated to be placed within a carton for shipment. One attempt toward providing a self-unloading skid is illustrated by U.S. Pat. No. 3,602,376 which includes four shock mitigating corner feet which are secured circumferentially with a strap. Each corner foot has an inclined surface upon which the load rests in a manner such that when the circumferential retaining strap is removed, the full load skids down the inclined surfaces to the floor. This may present an even dangerous situation when heavy machinery is concerned since the corner feet may be propelled out from under the machinery and drop the machinery abruptly to the floor. It is an object of this invention to overcome the disadvantages of the above mentioned prior cushioning devices.

It is another object of this invention to provide a cushioning, self-unloading machinery carrier which supports the static machine weight in the vertical direction while providing cushioning in the horizontal directions.

It is yet another object of this invention to provide a cushioning, self-unloading machinery carrier which machinery having legs or casters may be shipped on providing protection to such appendages.

It is yet another object of this invention to provide a cushioning, self-unloading machinery carrier which permits lowering of the machinery to the desired position on the floor without shock, one end at a time.

These and other objects, advantages and features of this invention will be apparent from the description and by reference to the drawings wherein preferred embodiments are shown as:

FIG. 1 is an exploded perspective view of cushioned shipping supports according to one embodiment of this invention showing how the machinery sits thereupon;

FIG. 2 is a perspective view of a cushioned shipping support according to one embodiment of this invention;

FIG. 3 is a top view of a cushioned shipping support as shown in FIG. 1;

FIG. 4 is a sectional view along the line 4—4 shown in FIG. 3;

FIG. 5 is a sectional view along the line 5—5 as shown in FIG. 3;

FIG. 6 is a sectional view along the line 6—6 as shown in FIG. 3;

FIG. 7 is the same sectional view as shown in FIG. 5 having the machinery placed upon the cushioned shipping support;

FIG. 8 is a perspective view showing another embodiment of supporting machinery on the cushioned shipping supports of this invention; and FIG. 9 is a sectional view along the line 9—9 shown in FIG. 8.

The preferred embodiment illustrated in the drawings and the description of the preferred embodiments use the terminology "generally U-shaped" in describing the shape of the cushioned shipping support of this invention. However, such terminology is not intended to have any limitation upon the length of the legs extending from the base of the U nor the angle which the legs make with the base of the U. The cushioned shipping support is tailored to conform to the shape and size of the machinery for which it is intended and may be any straight edged polyagonal shape or rounded shape to so conform. The terminology "generally U-shaped" is meant to include all of these shapes.

The general principles of one preferred embodiment of the invention are best seen by reference to FIGS. 1 through 3. FIG. 1 schematically shows machinery 20 having three legs extending beneath the bottom surface at each end, shown as corner legs 21 and 22 and center leg 24 at one end and corner leg 23 at the other end. Generally U-shaped bumper-skid 40 is shown having base 41 connecting legs 42 and 43. In the figures, the opposite shock absorbing bumper-skid parts are denoted by corresponding numbers in the 100 series. As best seen in FIG. 2, leg 42 has body portion 46 and upper inwardly extending flange 44, while leg 43 has corresponding body portion 47 and upper inwardly extending flange 45. Wedge-shaped portion 50 extends from the inner portion of the base 41 and has platform 51 at its upper end adjacent base 41 and inclined surface 52. As shown in the figures, wedge-shaped portion 50 has slot 53 to accommodate machine leg 24. Therefore, it should be recognized that wedge-shaped portion 50 may be of any suitable length along base 41 and have appropriate slots or cutouts to accommodate projections from the bottom portion of the machinery which rests upon platform 51.

In use, machinery support bar 80 is secured adjacent the lower surface of the flanges. The top of machinery support bar 80 is level with platform 51 to accommodate machinery having a flat bottom. The machinery rests upon the support bar and the platform described above. As shown in FIG. 1, the machinery support bar extends between legs of the same bumper-skid. FIG. 8 shows another embodiment wherein the machinery support bar extends between legs of opposing bumper-skids. Machinery support bar 80 is held in rigid position by any suitable fastening means such as bolts 90 extending through holes 61 and 62. As shown in FIGS. 4–7, bolts 90 engage nuts 91, preferably attached to machinery support bar 80, so that bolts 90 draw machinery support bar 80 into firm engagement with the lower surfaces of flanges 44 and 45. Having nuts 91 attached to machinery support bar 80 in non-rotational relation permits tightening and loosening of bolts 90 from the top. Nuts 91 may be engaged within a slot permitting adjustment of the support bar with respect to the bumper-skid while providing non-rotation. Likewise, holes 61 and 62 may be slots to provide similar adjustment.

The width of platform 51 should be sufficient so that the machinery will firmly rest upon the platform without a tendency to slide down face 52 of wedge 50 until the bumper-skid is pulled outwardly. The designed strength of the bumper-skid may be readily adjusted for the weight of the machinery. Any desired number of reinforcing columns may be located in proximity to the platform, such as shown by columns 48 in FIGS. 3–7. The reinforcing columns may also be located directly under the platform or in wedge-shaped portion 50. Other methods of reinforcement against vertical forces may be used such as internal honeycomb or foam structures. Additional slots, such as slot 53, provide further strength to the platform against vertical forces.

The bumper-skid of this invention may be fabricated from any shock absorbing material. Preferably the bumper-skid of this invention is rotomolded or blow molded from a suitable synthetic thermoplastic material such as polyethylene, polypropylene, or polyvinyl chloride. The hollow bumper-skid may have a wall thickness determined by the desired strength characteristics and is generally about 3/32 to about ¼ inch. The exterior corners should be rounded to prevent hitting or catching on objects while being moved and to provide good cushioning. The exterior corner areas may be rendered further shock absorbing by slots 49 as shown in FIG. 3. Slots 49 are openings, such as saw cuts, generally at about right angles to the rounded corner to provide additional absorption to horizontal forces. The machinery support bar may be fabricated from any material having sufficient strength, usually wood or steel.

As best seen in FIG. 1, a bumper-skid is placed at oppoite ends of the machinery with base 41 and legs 42 and 43 extending beyond the end and sides of the machine horizontally and beneath the machine vertically. Machinery support bar 80 is shown in fixed position between legs 42 and 43. Machinery 20 is placed upon the bumper-skid resting upon platform 51 and machinery support bar 80. Machinery legs 21, 22 and 24 fit in open areas between machinery support bar 80 and base 41. As best seen in FIG. 7, the machinery legs do not extend to the bottom of base 41. The machinery may be fastened to the bumper-skid in any suitable manner; for instance, specialized machinery may have appendages suitable for bolting directly to the bumper-skid or securement means such as a hold-down strap shown in FIG 1 as 30 may be used providing securement at each end, such as a bolt through hole 32 fastening into securement receiving means 65 in the bumper-skid or securement receiving means 67 in machinery support bar 80. The securement means may also function to secure a protective means covering the machinery, such as an overbox. The opposing bumper-skid 140 is positioned in the same manner with securement means 31.

It is seen that with the machinery positioned upon the opposing bumper-skids in the above manner a utilized package is obtained which can be handled by conventional handling equipment such as cranes and forklifts. The shock absorbing bumper-skids extend beyond the ends of the machinery to provide cushioning in all horizontal directions while supporting the static machine weight and providing cushioning in the vertical direction.

One principal advantage of the cushioned shipping support of this invention is the ease of movement and unloading of the machinery. The plastic bumper-skids with the machinery thereupon may be skidded on a floor into its desired position while affording cushioning of both horizontal and vertical shocks. Shock-free unloading is provided by removing securement means holding the machinery to the bumper-skids. The machinery then remains resting upon the platform and machinery support bar. The machinery may be eased to the floor and removed from the bumper-skids one end at a time in a controlled and shock-free fashion. Fastening means holding the machinery support bar on the legs of one bumper-skid are loosened from the top and the fastening means removed. The machinery will then be supported on only the platform at that end. The bumper-skid is then pulled outwardly from the machinery end engaging the bottom of the machinery with the inclined surface of the wedge portion and lowering the machinery gently to the floor until the machinery weight is entirely supported by the machinery legs in the desired position. The bumper-skid is then completely removed and the machinery legs are sitting on the floor in the desired position with no other positioning necessary. The process is repeated for the other end of the machinery. It is seen that the unloading is identical whether the machinery support bar extends between legs of the same bumper-skid or between legs of opposing bumper-skids. When the machinery is extremely heavy, removal of the machinery support bar may cause the wedge-shaped portion to collapse due to the machinery weight. However, in such instances the machinery is still lowered gently to the floor and such cushioning may be enhanced by the wedge-shaped portion being filled with foam. Even when the machinery is lowered into position by collapse of the wedge-shaped portion, the wedge shape is desirable to facilitate removal of the bumper-skid. It is also advantageous to unload and position the machinery one end at a time when unloading without mechanical equipment. Using the cushioned shipping support of this invention, it is not necessary to use a platen or other structure which requires further moving of the machinery after it is removed from the shipping support.

It is recognized that the entire shipping assembly, the machinery and the cushioned shipping support, may be shipped on a conventional pallet. It is an advantage of the cushioned shipping support of this invention to provide shock protection upon removal of such a pallet, especially when this is necessary without handling equipment.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A cushioning, self-unloading machinery carrier comprising two opposing shock absorbing generally U-shaped bumper-skids each having a base connecting legs at each end thereof and adjoining opposite ends of said machinery, the legs of one U-shaped bumper-skid extending along the sides of said machinery toward the legs of the other U-shaped bumper-skid, the bumper-skids extending beyond the sides and ends of said machinery to absorb lateral shocks and extending beyond the bottom of said machinery to absorb vertical shocks, the inner portion of said base adjoining said legs of each U-shaped bumper-skid having a wedge-shaped portion with a platform at its upper end adjacent said base, said machinery resting upon said platform of each of said bumper-skids, the machinery sliding down said wedge until it rests upon the floor in the desired position when said bumper-skid is pulled away from the machinery.

2. The machinery carrier of claim 1 wherein each of said legs has an inwardly extending flange, the lower surface of said flange in approximately the same plane as said platform.

3. The machinery carrier of claim 2 wherein a machinery support bar is secured adjacent the lower surface of said flanges by fastening means, said machinery resting upon said platform and said machinery support bar.

4. The machinery carrier of claim 3 wherein said machinery support bar extends between legs of the same bumper-skid.

5. The machinery carrier of claim 3 wherein said machinery support bar extends between legs of opposing bumper-skids.

6. The machinery carrier of claim 3 wherein said fastening means is releasable from the upper side.

7. The machinery carrier of claim 1 wherein said wedge-shaped portion has openings for receiving the legs of said machinery.

8. The machinery carrier of claim 1 wherein said platform is reinforced against vertical forces by internal reinforcing means.

9. The machinery carrier of claim 1 wherein said bumper-skid is a hollow polyethylene structure.

* * * * *